Sept. 30, 1969  R. H. GRAF  3,470,552
BURR GAGE
Filed Jan. 19, 1967

INVENTOR.
RUSSELL H. GRAF
BY Ralph G. Hohenfeldt
ATTORNEY

United States Patent Office 3,470,552
Patented Sept. 30, 1969

3,470,552
BURR GAGE
Russell H. Graf, Milwaukee, Wis., assignor to General Electric Company, a corporation of New York
Filed Jan. 19, 1967, Ser. No. 610,359
Int. Cl. G01b 3/22; G08b 21/00
U.S. Cl. 340—267                    5 Claims

ABSTRACT OF THE DISCLOSURE

Two metal blocks are insulatingly joined as a unit with a surface of one block being parallel to and slightly offset with respect to the other. A battery in one block is in series with a lamp in the other. When the unit is placed on a metal test piece that has a burr which has a height greater than the offset, a circuit is completed and the indicating lamp lights.

BACKGROUND OF THE INVENTION

Punch press and shear operations cause burrs on metal objects. High burrs indicate to the machine operator that his punch, die, blade or other cutting tool should be sharpened. Heretofore, distinguishing acceptable burrs from those which are not has been left to the judgment, sight and touch of the operator. This practice often results in burrs in excess of tolerance.

There is no conventional measuring instrument available for making a convenient, quick and infallible determination as to whether a burr is acceptable or unacceptable. This inspired the present invention which involves a gage that is placed on the workpiece and over the burr. If the burr exceeds tolerance, a lamp mounted in the gage lights, thus signalling the operator to take corrective action. Errors in judgment are eliminated and better manufacturing quality control results.

SUMMARY OF THE INVENTION

An illustrative embodiment of the new burr gage is characterized as a block or prism of metal. At least one face of the block is machined to a fine finish and one portion of the face is offset, by the amount of the burr height, with respect to the other. The two portions of the block are insulated from each other and rejoined or bonded as a unit. The block is bored to create a cavity for a battery or for bringing in leads from an external low voltage transformer. An indicating lamp is screwed through a wall of one part of the block so the screw base is grounded to the block. The contact tip of the lamp extends into the cavity where it connects with the battery. When the gage block is placed on a workpiece, the insulation between block parts is bridged if a burr on the work piece is higher than the offset. This completes a series circuit through the lamp and indicates an unacceptably high burr.

The new gage may be made in various configurations to suit the contours of various workpieces. One gage may also have several offsets to enable use of the same gage for checking burrs of different acceptability tolerances.

Accordingly, it is evident that a general object of this invention is to provide a gage for quickly and accurately determining burr height or the height of any protuberance without needing to read the scale of a measuring instrument.

Other objects are to provide a gage that is simple to construct, durable, easy to handle and use, and that is readily adaptable to many different gaging conditions.

Achievement of the foregoing and other more specific objects will appear from time-to-time throughout the course of the ensuing specification.

DESCRIPTION OF THE PREFERRED EMBODIMENTS

Figure 1:
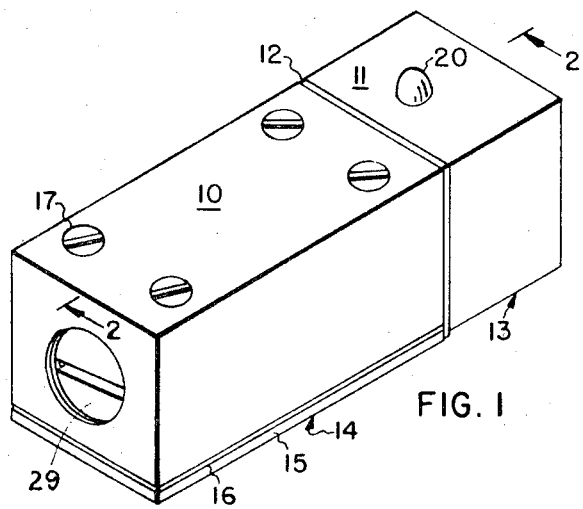
FIGURE 1 is an isometric view of one embodiment of the new burr gage.

FIGURE 1 shows that the gage comprises two principal prism shaped parts 10 and 11 which have an insulation barrier 12 between them. The bottom face 13 on part 11 is offset and in a parallel plane with respect to the bottom face 14 on part 10. The bottom face 14 is part of a sole plate 15 which has a thin shim 16 at its top interface with the bottom of part 10. The thickness of shim 16 may be selected to produce the desired amount of offset between parallel spaces 13 and 14 or the shim and the separate sole plate may be eliminated if the gage is made for a fixed offset. When the sole plate 15 is present, it is secured with screws 17 which extend vertically through part 10 and enter suitably threaded holes in sole plate 15 as may be seen in FIGURE 2.

Figure 2:
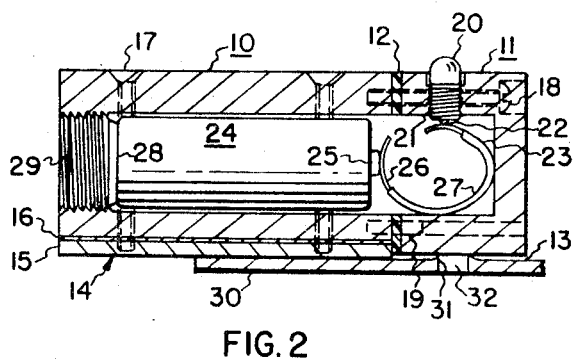
FIGURE 2 is a longitudinal section of the gage taken through a plane corresponding approximately with the line 2—2 in FIGURE 1 (this figure also includes a cross-section of a test piece)
Figure 3:
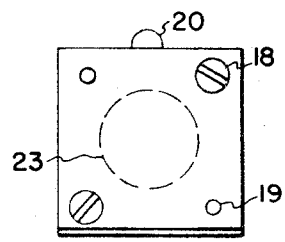
FIGURE 3 is a view of the end of the gage which is most remote from the observer in FIGURE 1; and, FIGURES 4 and 5 are cross-sections of individual alternative embodiments of the invention.

In the cross-sectional view of FIGURE 2, one may see that offset part 11 is fastened to part 10 with nonconducting screws 18 that pass through insulating barrier 12 and thread into suitable holes in part 10. Nonconducting dowel pins 19 are also provided for facilitating accurate and reproducible alignment of parts 10 and 11 and to avoid conduction between these parts.

An indicator lamp 20 is screwed through a wall contact of part 11 so that screw base 21 of the lamp connects to the metal part 11 and so that the contact tip 22 of the lamp is presented inside a cavity 23 which is approximately dimensioned to receive a battery 24. The battery may be a size AA dry cell. One terminal 25 of the battery connects to the contact tip 22 of the lamp by means of a spring metal contact element 26 which is partly covered with insulating sleeve 27. The other terminal 28 of the battery 24 is connected to part 10 by means of a threaded metal plug 29. The plug serves as a conductor, as a means for admitting the battery to cavity 23 and as a means for pressing the battery into firm electric contact with spring element 26.

Thus, it is seen that except for the fact that there is an electric discontinuity as a result of the insulation barrier 12 between parts 10 and 11, a series circuit would be formed from terminal 25 of the battery through contact element 26, the lamp 20, part 11 and then back to part 10 and the other terminal 28 of the battery.

Bridging the discontinuity or insulation gap involves the gaging procedure for which the device was designed. For example, as in FIGURE 2, the bottom face 14 of sole plate 15 may be caused to bear on a test piece 30 which is shown in cross-section and as being essentially flat except that it has a circumferential burr 31 surrounding a hole 32 which has been punched in the test piece. If the burr is acceptably low, it will not exceed the amount of offset between bottom surfaces 13 and 14 on respective parts 11 and 10 in which case the lamp will not light. If the burr height is greater than the offset, of course, the burr will make contact with face 13 and the lamp will light because the insulating gap in the series circuit will be bridged thus eliminating the electric discontinuity. Gages made in accordance with the design depicted in FIGURES 1 and 2 are now regularly employed by the present inventor to check burrs which are not to exceed 0.0055 inches above a plane.

Figure 5:
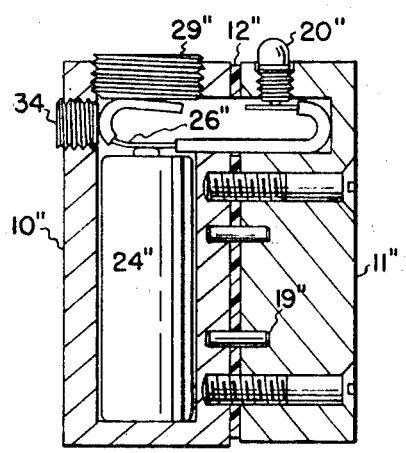
Figure 4:
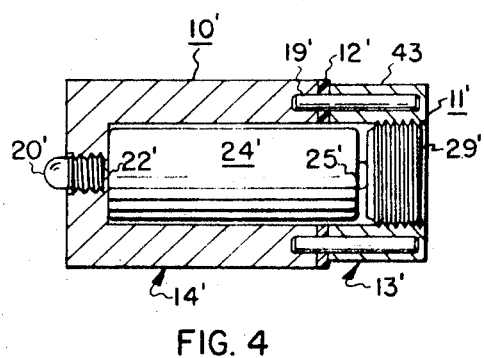

FIGURE 4 shows a cross-section of a burr gage which is modified to permit measurement of burrs of different heights with a single gage. Components having structure and function similar to components in FIGURES 2 and 5 are assigned the same reference numerals except that they are primed. In this case, body 10' has lamp 20' screwed into it coaxially with the battery 24' and the plug 29'. Offset part 11' is attached to part 10' with insulation 12' intervening. Attachment may be made with screws, not shown, or as in this case, with nonconducting dowel pins 19' which may be made of hard fiber. The interfaces between insulation barrier 12' and parts 10' and 11' may be adhered with an epoxy or other strong resin adhesive rather than to rely exclusively on dowels if insulating screws are not used. A thin cup washer, not shown, may be located between plug 29' and battery terminal 25' to obtain resilient contact pressure on the battery and lamp if desired.

In the FIGURE 4 embodiment, both the upper and lower surfaces 13' and 43, respectively on part 11' are offset with respect to the upper and lower faces, respectively, of part 10' in which case two burr gages with different offsets are provided. The vertical side faces of part 11' may also be offset to provide a total of four gaging elements, if desired. This is possible because the lamp 20' is in the end of the gage as in FIGURE 4 with the additional advantage that the lamp is easily observable regardless of how the gage is positioned on a workpiece.

The alternative embodiment in FIGURE 5 has double primed reference numerals for similar parts and is distinguished by having the battery 24" juxtaposed to block 11" and perpendicular to the offset gaging surface. This requires a plug 34 through a wall of part 10" to allow for introduction of contact spring 26" after battery 24" is admitted through the hole for the other plug 29". The embodiment of FIGURE 5 is structurally and functionally similar to the other embodiments including the fact that the offset surface is at the bottom. However, the longer dimension in the vertical direction makes this particular configuration more appropriate for gaging burr heights in fairly deep recesses.

Although several embodiments of the new burr height gage have been described, it is to be understood that these are illustrative rather than limiting for the components may be variously arranged to adapt the invention to measure burr height or other elevations on various workpieces.

I claim:

1. A gage comprising:
   (a) first and second conductive parts having an internal cavity, one of which parts has an external surface that is offset with respect to an adjacent external surface of the other,
   (b) insulating means separating the parts electrically,
   (c) means joining the parts together mechanically in a manner that maintains the electrical separation created by the insulating means,
   (d) one of said parts having a hole extending from its outside to the cavity, which hole is adapted to receive an indicator lamp,
   (e) a pair of electric power terminals inside the cavity, one of the terminals being adapted to connect with one part and the other being adapted to connect with a lamp projecting through the hole, whereby a series circuit may be completed through the lamp by electrically connecting the parts with a conductive test object that bridges the insulating means from one of said external surfaces to the other.

2. A gage for checking the height of a burr that may form at a sheared edge or around a punched hole or the like, comprising:
   (a) first and second conductive parts having a common internal cavity, one of said parts having an external surface that is offset with respect to an adjacent external surface of the other,
   (b) insulating means separating the parts electrically,
   (c) means joining the parts together mechanically in a manner that maintains the electrical separation created by the insulating means,
   (d) an indicating lamp having one base contact inserted in conductive relationship with and through one part to present its other base contact to the inside of the cavity,
   (e) a battery in said cavity, the terminals of which connect respectively to the said other lamp base contact and to the part without the lamp,
   (f) the lamp being adapted to light when a circuit is completed by a conductive test piece that contacts one part and has a burr of greater height than the offset so as to contact the other part.

3. The invention set forth in claim 2 wherein:
   (a) the first conductive part has an opening for admitting the battery to the cavity and a removable plug means adapted to be secured in the opening and to retain the battery under contact pressure in the cavity,
   (b) a spring contact element interposed in the cavity between a terminal of the battery and the said other base terminal of the lamp,
   (c) the said lamp being inserted through the second conductive part.

4. The invention set forth in claim 2 wherein:
   (a) the second conductive part has an opening for admitting the battery in the cavity and a removable plug means adapted to be secured in the opening and to retain the battery under contact pressure therein,
   (b) the said lamp being inserted through the first conductive part substantially coaxially with the battery and the plug means.

5. The invention set forth in claim 2 wherein:
   (a) the said first and second conductive parts are juxtaposed,
   (b) the first part having an opening for admitting the battery to the cavity and a removable plug means adapted to be secured in the opening substantially coaxially with the battery,
   (c) the said cavity having a portion in the first part for the battery and another portion continuing at essentially a right angle into the second part,
   (d) a contact spring means interposed between a terminal of the battery and the said other base contact of the lamp, and
   (e) the said first part having an opening aligned with the right angular portion of the cavity, whereby to admit and remove the contact spring means.

References Cited

UNITED STATES PATENTS 2,435,514   2/1948   Ross _____ 340—265

JOHN W. CALDWELL, Primary Examiner

PERRY PALAN, Assistant Examiner

U.S. Cl. X.R.

33—169